United States Patent [19]

Kovara

[11] Patent Number: 5,029,695
[45] Date of Patent: Jul. 9, 1991

[54] IMPROVED STARWHEEL

[75] Inventor: Daniel L. Kovara, Waterford, Wis.

[73] Assignee: S. C. Johnson & Son, Inc., Racine, Wis.

[21] Appl. No.: 504,361

[22] Filed: Apr. 3, 1990

[51] Int. Cl.⁵ .............................................. B65G 29/00
[52] U.S. Cl. .................... 198/473.1; 198/480.1; 198/803.11; 53/544; 141/165; 269/266
[58] Field of Search ............... 198/384, 473.1, 480.1, 198/803.4, 803.11; 269/265, 266; 53/146, 272, 544; 141/165

[56] References Cited

U.S. PATENT DOCUMENTS

| 1,365,773 | 1/1921 | Dickerson . | |
|---|---|---|---|
| 1,574,307 | 2/1926 | Risser | 198/803.11 X |
| 1,708,313 | 4/1929 | Larsen . | |
| 2,176,557 | 10/1939 | Lippold . | |
| 2,184,493 | 12/1939 | Gladfelter . | |
| 2,713,960 | 7/1955 | Siegal . | |
| 3,313,409 | 4/1967 | Johnson . | |
| 3,393,799 | 7/1968 | Schmersal . | |
| 4,047,709 | 9/1977 | Thyberg et al. | 269/266 X |
| 4,124,112 | 11/1978 | Mohney et al. . | |
| 4,200,183 | 4/1980 | Riggs . | |
| 4,225,035 | 9/1980 | Mohney et al. . | |
| 4,355,669 | 10/1982 | Miller . | |
| 4,378,665 | 4/1983 | Crankshaw et al. . | |
| 4,949,947 | 8/1990 | Savoie et al. | 269/266 |

FOREIGN PATENT DOCUMENTS 0211220 9/1986 Japan ............................ 198/473.1

Primary Examiner—Joseph E. Valenza
Assistant Examiner—Tuan N. Nguyen

[57] ABSTRACT

This invention relates to an improved starwheel (20) for use in continuous packaging, filling or labelling lines for articles such as cans and bottles which has a plurality of spaced orienting devices (18) around its periphery. The improvement resides in that the orienting devices (18) comprise moveable fingers (26) which can readily assume the contour of the outer periphery of such articles and be releasably locked in place after the contour of the article is captured in the orienting device. As a result, starwheel (20) does not have to be removed from the operating line to accommodate a new size or shape of article, the line can be quickly restarted using the new article and a large inventory of starwheels for various sizes and shapes of articles is unnecessary.

4 Claims, 2 Drawing Sheets

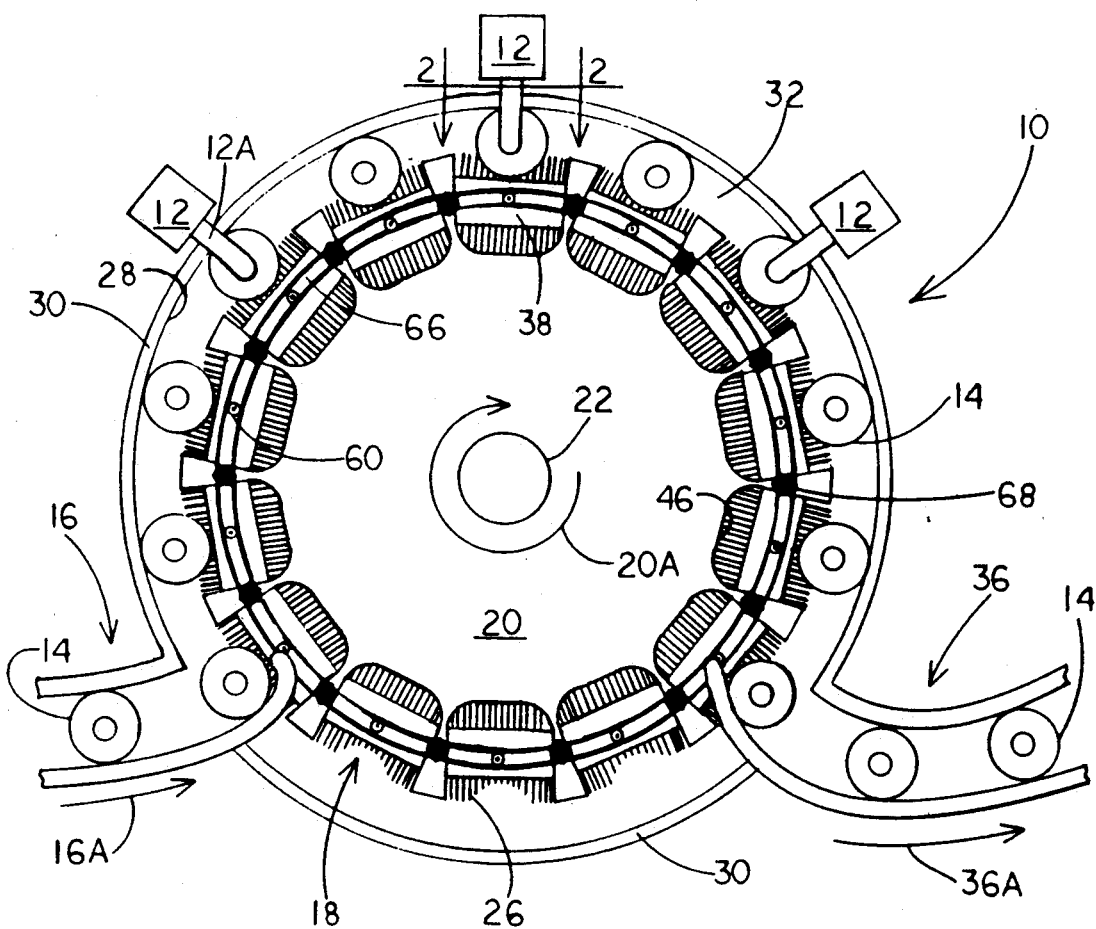
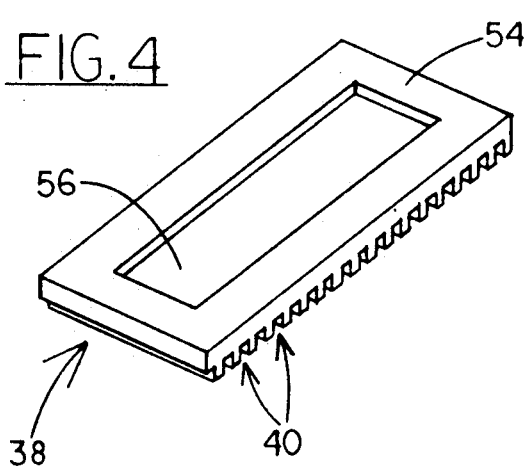
FIG.4
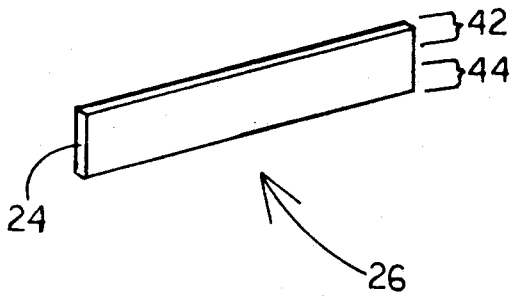
FIG.5

2

IMPROVED STARWHEEL

TECHNICAL FIELD

This invention relates to an improved starwheel for use in continuous packaging, filling or labelling lines which has a plurality of spaced orienting means around its periphery comprising movable fingers which can readily assume the contour of articles to be processed on such a line.

BACKGROUND ART

Starwheels have been used in continuous processing lines for a number of years to properly orient articles such as bottles, cans and other containers beneath filling heads, before labelling machinery, beneath capping devices and the like. Continuous processing lines are often used with various articles to maximize use of the capital investment in the line and to increase productivity. Due to the variety of sizes and shapes of articles to be passed through such lines, one type of starwheel does not generally accommodate a great number of article configurations. Typically, a starwheel has an outer peripheral surface which is contoured to substantially match the outer periphery of a particular article to be run through the line. Therefore, it has been necessary to keep a number of starwheels on hand. A certain amount of time is required to substitute starwheels when a new size or shape of article is to be run through the line.

To avoid these disadvantages, U.S. Pat. No. 4,378,665 to Crankshaw et al. teach the use of a starwheel having a resilient outer peripheral surface which accommodates containers of various sizes and shapes by flexing when the container is squeezed between the starwheel and a guide. This puts pressure against the container and it may rub against the guide during the time it is in contact with the starwheel. This starwheel also lacks a means by which containers can be accurately spaced around the periphery of the starwheel.

In U.S. Pat. No. 2,713,960, Siegal shows a starwheel that employs a stretched spring to accommodate variations in contour of the articles to be passed through a continuous line. Like the Crankshaw et al. starwheel, the spring can undesirably press the container between the guide and the starwheel spring. Since the container can move against the spring, it is possible that the container could become misoriented (e.g., due to friction against the guide) as it travels around the line while in contact with the starwheel.

U.S. Pat. No. 4,124,112 to Mohney et al. teaches an odd-shaped container indexing starwheel which uses hemispherical clamps to grasp the outer periphery of an article and thus accommodate articles of various sizes and shapes. This requires a rather complex system of mechanical parts to cause the clamps to properly close around an article.

U.S. Pat. No. 1,365,773 to Dickerson uses a fixed peripheral surface starwheel in combination with flattened S-shaped springs on the outside perimeter of the line to guide and move the articles into individual pockets on the starwheel to properly position them for filling.

To further show the state of the art, U.S. Pat. Nos. 1,708,313 to Larsen and 2,176,557 to Lippold employ starwheels which have fixed surfaces for receiving articles.

U.S. Pat. No. 2,184,493 to Gladfelter uses a fixed starwheel surface which is fed by a large wheel containing individual bottle holders. Guide brackets 57 are secured to a stationary table so that they can be moved inwardly or outwardly according to the diameter of the bottles in the line. FIG. 12 shows a bottle cap latch which has a coil spring 119 which pulls the two cap latches 116 together.

U.S. Pat. No. 4,355,669 to Miller teaches an apparatus for canning food having components 24 and 26 which can be varied to fit any size food container.

In a different field of art, devices consisting of a plurality of movable wires held in a locking brace are sometimes used in carpentry to obtain the contour of a corner or other odd-shaped surface. The device is pressed against the corner and the rods move in to obtain a contour of the corner which can then be transferred to a piece of wood which is shaped to fit the corner.

SUMMARY DISCLOSURE OF THE INVENTION

One object of this invention is to provide a starwheel for use in a continuous manufacturing or operation line which can accommodate a variety of sizes and shapes of articles such as cans, bottles and the like to be run through the line without having to substitute a new starwheel for the previous one when a change in article size or shape is to be made.

Another object of this invention is to provide a starwheel with article-orienting means along the periphery of the wheel which is simple to manufacture and use.

A further object of this invention is to provide a starwheel which can fairly accurately assume the outer contour of the articles to be run through the line. It thus provides a secure, custom-made orienting means for each article which does not exert undue pressure against the article, but still prevents the article from moving out of the desired orientation as it is carried through the line and during which an operation such as filling, labelling or capping is performed on it.

These and other objects and advantages are provided by a starwheel having a plurality of orienting means or devices spaced around the periphery of the starwheel. The improvement resides in having each orienting means comprise a series of spaced fingers within a lockable holding means which permits the ends of the fingers to be moved against the outside periphery of the article to thereby assume the contour of the article and orient it between the orienting means and an outer article-retaining means which can simply be a plastic band. The number of fingers present is that which is sufficient to accommodate the outer periphery of the article and to fix it in the desired orientation. The fingers are spaced apart from one another in a line which preferably lies in the same plane or is parallel to the plane of the starwheel.

In a more preferred embodiment, the orienting means comprises a lower finger channel plate having a plurality of channels for closely receiving a lower portion of the fingers which preferably have a rectangular configuration and a moveable upper finger channel plate having a plurality of channels for closely receiving a lower portion of the fingers. To provide a lockable holding means, the height of the finger is greater than the combined depth of the upper and lower finger channel for each finger. The upper plate is releasably pressed toward the lower plate to form a locking means for the fingers once they have been moved to assume the outer periphery of the article. Preferably, the locking means is a thumbscrew and the lower finger channel plate is formed as a part of the wheel.

BRIEF DESCRIPTION OF THE DRAWINGS

The above and other objects, features and advantages of the present invention will become apparent to those skilled in the art upon an examination of the following description and drawings which are merely illustrative of the present invention. A preferred embodiment of the present invention is illustrated in the accompanying drawings to enable those skilled in the art to better practice the present invention. Like parts are given like numbers in the Drawings. In the Drawings:

FIG. 1 is a plan view of a continuous operation line employing a starwheel of the present invention.

FIG. 4 is a perspective view of the upper finger channel plate.

FIG. 5 is a perspective view of a rectangular finger.

BEST MODE FOR CARRYING OUT THE INVENTION

Figure 2:
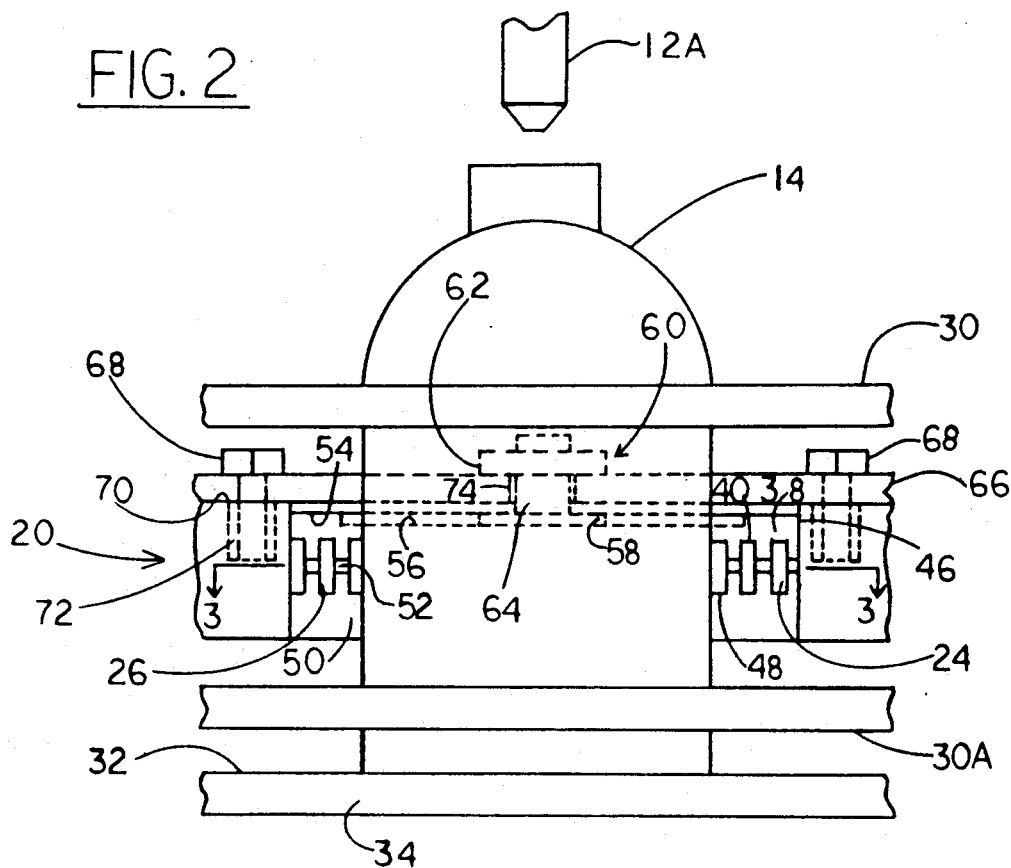
FIG. 2 is a side elevation of a portion of the line viewed from lines 2—2.

In FIG. 1, a continuous operation line 10 is shown which employs filling machines 12 to fill articles shown as bottles 14 as they pass through the line 10. Bottles 14 pass along feeding means 16 in the direction of arrow 16A by a conventional conveyor or screw feed means (not shown) until they are placed in contact with one of the orienting means or devices 18. Starwheel 20 rotates in the direction of arrow 20A around spindle 22 by a conventional drive means (not shown) and moves bottle 14 between the ends 24 of fingers 26 and the peripheral surface 28 of an outer article retaining means shown as band 30 (e.g., made of a self-lubricating plastic such as nylon) as starwheel 20 rotates. Individual bottles 14 are thus oriented by orienting means 18 and held in place between the ends 24 of fingers 26 and surface 28 as bottles 14 proceed toward filling machines 12.

FIG. 2 shows bottle 14 resting on flat surface 32 of floor 34 beneath nozzle 12A of filling machine 12 ready to be filled. Bottle 14 is held in place by ends 24 and bands 30 and 30A where band 30A has the same configuration as band 30 and is moved over surface 32 by the rotation of starwheel 20.

After filling, bottles 14 are moved away from filling machine 12 by the rotation of starwheel 20 up to exit means 36 which removes bottles 14 from contact with orienting means 18 and sends them along a conventional conveyor or screw feed means (not shown) away from starwheel 20 in the direction of arrow 36A, possibly for further operations such as capping and labelling.

Turning to the orienting means which is the subject of the improved starwheel of this invention, FIG. 4 is a perspective view of upper channel plate 38 of chrome plated 1018 hardened steel having upper finger channels 40 extending across the underside of plate 38 for closely receiving an upper portion 42 of finger 26 as shown in FIG. 5. Fingers 26 as well as starwheel 20 can be made of any appropriate material such as metal or plastic with a plastic such as DELRIN ® linear polyoxymethylene type acetal resin presently being preferred. The materials used to manufacture the apparatus of the present invention form no part of the present invention. Plates 38 closely, but moveably, fit within cavities 46 in starwheel 20 containing lower finger channels 48 to closely receive lower portion 44 of fingers 26 and serve to form lower finger channel plates 50.

The depth of individual channels 40 and 48 is less than the height of individual fingers 26 leaving a space 52 between plates 38 and 50 so that moveable upper plate 38 can be pressed downward against fingers 26 and releasably lock fingers 26 in the desired orientation which assumes the outer periphery of bottle 14. As can be seen in FIGS. 2 and 4, upper surface 54 of plate 38 contains recess 56 into which stabilizer plate 58 fits. Plate 58 is the lower part of thumbscrew 60 and exerts pressure on upper plate 38 when thumbwheel 62 is turned to cause threaded rod 64 to press against plate 58 and recess 56 to push plate 38 downward against fingers 26 and fixed lower plate 50, thereby locking fingers 26 in place.

Threaded rod 64 of thumbscrew 60 is threaded through threads 74 in chrome plated hardened 1018 steel ring 66 which in turn is bolted onto starwheel 20 by means of bolts 68 which are threaded into threaded inserts 72 in starwheel 20. A small amount of clearance is left between the lower surface 70 of ring 66 and surface 54 of upper plate 38 to permit thumbscrew 60 to be untightened and release fingers 26 for repositioning.

INDUSTRIAL APPLICABILITY

Figure 3:
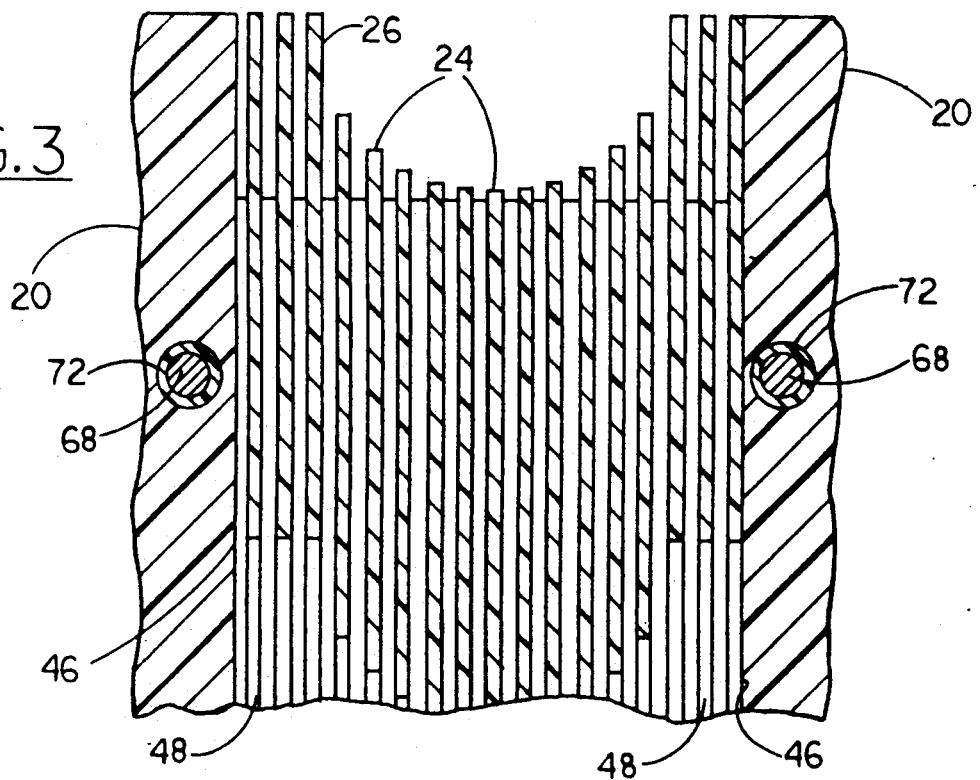
FIG. 3 is a partial cross-section, taken along lines 3—3 of FIG. 2, of the lower finger channel plate showing the orientation of the fingers, but with the article omitted from the view.

In practice, one simply releases thumbscrew 60 on each orienting means 18, pushes fingers 26 toward the center of starwheel 20, and inserts a new article such as a bottle or can to be run through line 10 between bands 30 and 30A and the ends 24 of fingers 26. This can be done without any need to remove starwheel 20 from line 10. Fingers 26 are then moved against the outer periphery of the article as shown in FIG. 3 where the article has been omitted for purposes of clarity. As can be seen, the contour of the article is formed by the finger ends 24. When the appropriate contour is obtained, thumbwheel 60 is turned to lock fingers 26 in place and the next orienting means 18 is adjusted until all have the proper contour. This simple and quick operation avoids the need to keep line 10 out of service for a long period of time. Filling or other operations can be commenced using a different type of article in a relatively short period of time without dissembling the equipment to remove the starwheel and a large inventory of starwheels is rendered unnecessary.

From the above, those skilled in the art will appreciate that orienting means 18 can quickly be changed from using round articles to those having square, oval or complex outer peripheries. The complexity of the outer periphery of the article will dictate the number of fingers 26 needed to orient and hold the article in place. More fingers will enable orienting means 18 to better approximate the contour of the outer periphery of the bottle. Likewise a change in the height, width or shape of the fingers can also help in accommodating the outer periphery of the article. For example, the fingers could be rods or could have a triangular cross-section.

Likewise, upper plate 38 could be formed as a part of starwheel 20 with lower plate 50 being moveable or else both plates could be moveable relative to one another and secured to starwheel 20 in a cavity.

Other modifications and variations of the present invention will become apparent to those skilled in the art from an examination of the above specification and drawings. Therefore, other variations of the present invention may be made which fall within the scope of the appended claims even though such variations were not specifically discussed above.

What I claim is:

1. An improved starwheel for use in a continuous operation line for orienting and fixing a plurality of articles while an operation is performed on the articles, wherein the starwheel comprises a wheel having a peripheral surface and is adapted to be engaged with a wheel rotating means forming a part of said line wherein the articles are placed, by a feeding means, in contact with an outer article-retaining means and one of a plurality of orienting means spaced around said peripheral surface and are removed by an exit means from contact with the article-retaining means and the orienting means after the operation is performed, wherein the improvement comprises said orienting means comprising a plurality of spaced fingers held within a lockable holding means which permits the ends of individual fingers to be moved against the outside periphery of each article to thereby assume the contour of the article and orient it as desired to accomplish the operation to be performed, there being a sufficient number of fingers present in each orienting means to accommodate the outer periphery of the article and to fix it in the desired orientation, wherein the orienting means comprises a lower finger channel plate having a plurality of channels for closely receiving a lower portion of the fingers, the lower finger channel being adapted to receive a moveable upper finger channel plate having a plurality of channels for closely receiving an upper portion of the fingers wherein the height of each finger is greater than the combined depth of the upper and lower finger channel for each finger, and a locking means for releasably pressing one plate against the other plate to fix the distance from which each finger can be extended out of the orienting means toward the article.

2. The starwheel as claimed in claim 1 wherein the locking means is a thumbscrew.

3. The starwheel as claimed in claim 1 wherein each finger has a rectangular shape.

4. The starwheel as claimed in claim 1 wherein the lower finger channel plate is formed as a part of the wheel.

* * * * *